(12) United States Patent
Paiam

(10) Patent No.: US 6,535,672 B1
(45) Date of Patent: Mar. 18, 2003

(54) ACTIVE OPTICAL MMI WAVEGUIDE DEVICE

(75) Inventor: Reza Paiam, Ottawa (CA)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 09/559,552

(22) Filed: Apr. 27, 2000

(30) Foreign Application Priority Data

Apr. 30, 1999 (CA) .............................. 2271159

(51) Int. Cl.$^7$ ................................. G02B 6/26
(52) U.S. Cl. ..................... 385/50; 385/39; 385/42; 385/51
(58) Field of Search .................. 385/50, 51, 39, 385/40, 42

(56) References Cited

U.S. PATENT DOCUMENTS

| | | | | |
|---|---|---|---|---|
| 4,679,894 A | * | 7/1987 | Pavlath ........................ | 385/30 |
| 5,465,310 A | * | 11/1995 | Kersten et al. ............... | 385/22 |
| 5,581,642 A | | 12/1996 | Deacon et al. ............... | 385/15 |
| 5,857,039 A | * | 1/1999 | Bosc et al. ................... | 385/14 |
| 5,970,186 A | * | 10/1999 | Kenney et al. ............... | 385/16 |
| 6,122,416 A | * | 9/2000 | Ooba et al. .................. | 359/115 |
| 6,144,780 A | * | 11/2000 | Marcuse et al. .............. | 385/16 |
| 6,282,335 B1 | * | 8/2001 | Losch et al. .................. | 385/14 |
| 6,311,004 B1 | * | 10/2001 | Kenney et al. ............... | 385/130 |

FOREIGN PATENT DOCUMENTS

EP WO 98 40771 9/1998 ............ G02B/6/12

OTHER PUBLICATIONS

"Optical Multi–Mode Interference Devices Based on Self-Imaging: Principles and Applications" Soldano et al. Journal of Lightwave Technology, vol. 13, No. 4, Apr. 1, 1995, pp. 615–627.

* cited by examiner

Primary Examiner—Ellen E. Kim
(74) Attorney, Agent, or Firm—Neil Teitelbaum

(57) ABSTRACT

An optical waveguide device has a hybrid core and a cladding. A first waveguide having a glass core is coupled to a polymer waveguide disposed adjacent and parallel to the first waveguide such that the respective cores are contiguous in a coupling region. The polymer is a thermo-optically active polymer. A heater is provided over the coupling region and the refractive index of the polymer is varied by applying heat to the region. By application of sufficient heat, the refractive index of the polymer can be changed to approach the refractive index of the cladding whereby the device acts as a simple glass waveguide. In the absence of heat, the device acts as a MMI coupler.

18 Claims, 8 Drawing Sheets

1
Core
Lower cladding
substrate

2
Metal mask
grafting parts

3
Grafting parts

4
Stack with
grafting parts

5
Metal mask waveguide

6
Waveguide with grafting parts

7
Upper cladding

1
Core
Lower cladding
substrate

2
Metal mask
grafting gaps

3
Gaps for
grafting

4
Upper cladding

1

$V_P > V_C$

2

$V_P < V_C$

3

$V_P = V_C$

4

| PROPERTY | | FUSED SILICA | BK7 GLASS | SAPPHIRE | CALCIUM FLUORIDE | SILICON | POLYMER GLASS | POLYMER RUBBER |
|---|---|---|---|---|---|---|---|---|
| REFRACTIVE INDEX | $n$ | 1.4 | 1.5 | 1.7 | 1.4 | 3.5 | 1.4-1.6 | 1.4-1.6 |
| THERMOOPTIC COEFF. | $dn/dT$ ($10^{-6} K^{-1}$) | 10 | 1.6 | 14 | -9 | 200 | -100 | -500 |
| EXPANSION COEFF. | $(dl/l)/dt$ ($10^{-6} K^{-1}$) | 0.5 | 7 | 8 | 19 | 3 | 100 | 300 |
| THERMAL CONDUCTIVITY | $\lambda$ ($Wm^{-1}K^{-1}$) | 1.4 | 1 | 22 | 10 | 84 | 0.2 | 0.2 |
| YOUNG'S MODULUS | $E$ (GPa) | 73 | 81 | 345 | 76 | 131 | 2 | 0.001 |
| POISSON RATIO | $\nu$ | 0.2 | 0.2 | 0.2 | 0.2 | 0.3 | 0.4 | 0.5 |

FIG. 16

ACTIVE OPTICAL MMI WAVEGUIDE DEVICE

FIELD OF THE INVENTION

This invention relates to optical waveguides, and more particularly, to an optical coupler having a hybrid core, a portion of which is an organic material, and an adjacent contiguous portion being an inorganic material.

For many years now, waveguides in the form of optical fibers have received widespread interest for information and data transfer. Fiber-guided modulated light beams are useful in many applications, for example, telecommunications, computer link-ups, and automotive controls. Advantageously, fiber optic linkages have a greater information carrying capacity as compared to metal wires carrying electrical signals. Furthermore, fiber optics are less likely to suffer from external interference, such as electromagnetic radiation.

Typically, optical fibers comprise a light-carrying core, for example an inorganic glass such as fused silica or a polymer such as polymethyl methacrylate, and a cladding material having a lower refractive index than the core. The cladding material serves to confine the light energy within the core and thereby allows propagation of light by a phenomenon generally known as "total internal reflection."

Characteristically, glass optical fiber cores have very low optical loss and are generally preferred over polymer waveguides for long distance applications.

As of late, monolithic waveguiding devices have gained popularity. These devices tend to be compact and cost effective to manufacture. Such devices are described by the applicant in U.S. Pat. No. 5,470,692 entitled Integrated optic components issued Nov. 28, 1995. In the '692 patent an integrated optic component comprises a substrate carrying a layer of polymeric material. The component may be poled so as to be an active component and may be in the form of a ridge guide.

Many monolithic devices having, for example polymer waveguides disposed therein provide a single guided mode, similar to single mode optical fibre. Another class of monolithic waveguiding devices are comprised of waveguides disposed in glass wherein an ion diffused region or a reactive-ion-etched structure overcoated with a cladding can serve as a waveguide core.

Polymer waveguides disposed on a substrate offer some advantages over inorganic glass such as silica, in some respects, however, low levels of signal loss i.e. high transparency of inorganic glass is desirable and preferred to polymer. Polymer waveguides are noted for low transparency, i.e. significant loss; polymer waveguides have a high co-efficient of A expansion and, associated with that a high (negative) thermo-optic co-efficient, and a low thermal conductivity. In contrast, inorganic glass has a high transparency, a high thermal conductivity, and a low (positive) thermo-optic coefficient.

This invention utilizes these differences in the two materials in a synergistic manner by providing a inorganic glass/polymer hybrid core structure that is highly advantageous.

Since polymer waveguides are suitable as active devices, they are also useful in optical switches and couplers.

It is an object of this invention, to provide a waveguide that uses the beneficial characteristics of inorganic glass such as silica, and as well the beneficial characteristics of polymer waveguides, while minimizing the unwanted characteristics of these materials.

For example, it is desired to have a optical waveguide with an active region which is highly thermo-optic active, so that it may be switched, attenuated, or modulated with low power. Notwithstanding, it is desired to have an optical waveguide that under normal transmission is highly transparent, i.e. has little signal power loss. Yet still further, it is desired to have a waveguide wherein the refractive index can be changed relatively efficiently and significantly with minimal power. And yet still further, it is desired to have a waveguide with two different regions, having guided light transmitting cores that have relatively different refractive indices, yet that can be modified by the application of a suitable energy, to lessen or obviate the refractive index difference between the two regions. The latter being significantly useful in optical coupling applications such as this invention.

It is an object of this invention, to provide such a waveguide for a novel optical coupler that has heretofore, not been realized.

It is an object of this invention to provide a coupler that can serve as an MMI coupler or a suppressed MMI device in a controllable manner and dependent upon the application of a control signal.

SUMMARY OF THE INVENTION

This invention is not limited to waveguides having a core of a particular shape, however this invention is related to a waveguide having a core having a hybrid of materials having different optical properties contiguously disposed one beside the other.

In a preferred embodiment the contiguous cores consisting of dissimilar materials having dissimilar optical properties have a substantially similar mode field diameter.

In accordance with the invention, a multi-mode interference optical device is provided comprising:
  a first waveguide having an input end and an output end and having a glass core;
  a second waveguide adjacent to the first waveguide having a hybrid core having a first core section of a first material and a second contiguous core section of glass;
  a cladding covering at least some of the hybrid core and some of the first waveguide glass core; and,
  a heater coupled to the cladding for relatively varying the refractive index difference between the first section of the hybrid core and the glass core in the first waveguide in a controlled manner, so that the refractive index difference between the glass and the first material is variable between substantially about zero and some number greater than zero in the presence or absence of applied heat.

In accordance with the invention, a multi-mode interference optical device is provided, comprising:
  a first waveguide having an input end and an output end and having a glass core;
  a second waveguide adjacent to the first waveguide having core having a first core section of a first material;
  a cladding covering at least some of the first core section and some of the first waveguide glass core; and,
  a heater coupled to the cladding for relatively varying the refractive index difference between the first core section and the glass core in the first waveguide in a controlled manner, so that the refractive index difference between the glass and the first material is variable between substantially about zero and some number greater than zero in the presence or absence of applied heat.

In accordance with the invention an MMI coupler is provided comprising:

a first waveguide core of silica;

a second waveguide core of polymer directly next to and contacting the first waveguide core of silica;

a cladding covering the first and second waveguide core, having a lower refractive index than the silica core; and, a controllable heater for heating at least a region of the second waveguide core, at least the contacting regions of the first and second waveguide cores defining the length of the MMI coupler.

In accordance with another aspect of the invention, a tunable optical MMI coupler is provided comprising:

a first single mode glass waveguide core with a first refractive index $n_1$ and a second polymer waveguide core having at least a portion contacting and in parallel with the first glass waveguide;

a cladding having a second refractive index $n_2$ covering at least some of the first single mode waveguide and the second polymer waveguide; and, means for varying the refractive index of the second waveguide core to values between $n_1$ and $n_2$.

Advantageously, combining two different polymers or preferably polymer and glass wherein polymer has a high negative thermo-optic coefficient compared with glass which has a small positive thermo-optic coefficient, sufficient tuning can be achieved by the application of heat.

Alternatively tuning can be achieved by applying a voltage to vary the refractive index if an electro-optic polymer is used, or compression may be used as a means of varying the polymers refractive index and providing an index difference between the polymer and adjacent glass region.

BRIEF DESCRIPTION OF THE DRAWINGS

Exemplary embodiments of the invention will now be described in conjunction with the drawings, in which:

FIG. 16 is a table illustrating some properties of Photinic Materials; and,

DETAILED DESCRIPTION

Figure 1:
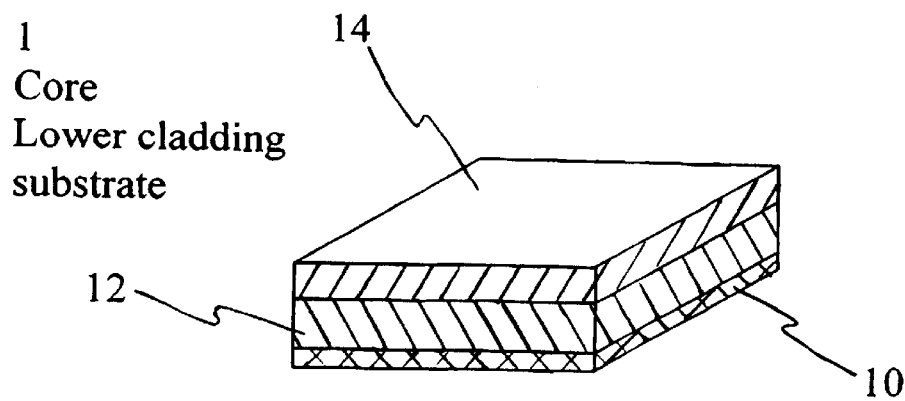
FIG. 1 is an isometric view of a two layered planar structure on a flat substrate serving as a base for fabricating a waveguide device.
Figure 2:
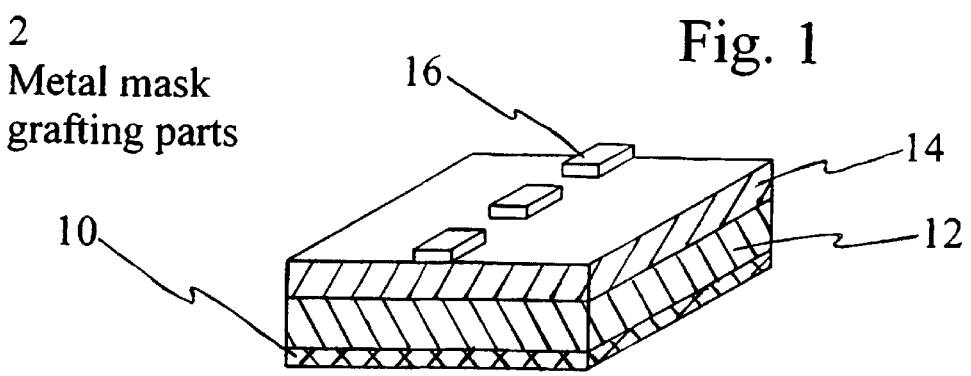
FIG. 2 is an isometric view of the device shown in FIG. 1 including a metal mask disposed atop an upper layer for use in providing grafted parts.
Figure 3:
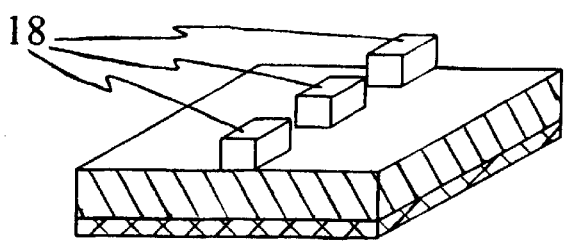
FIG. 3 is an isometric view of the device shown in FIG. 2 wherein three grafting parts are shown after removing unmasked material around the parts.
Figure 4:
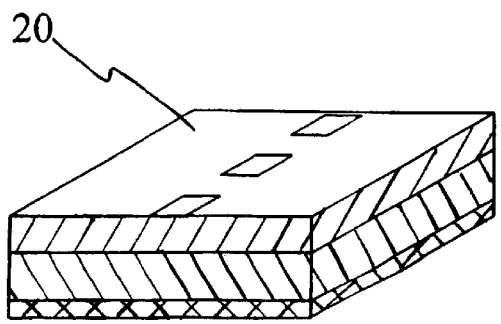
FIG. 4 is an isometric view of the device shown in FIG. 3 including an additional spin coated layer.
Figure 5:
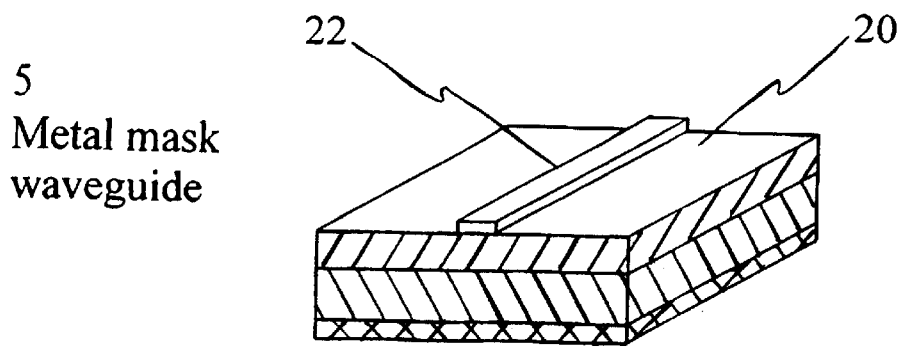
FIG. 5 is an isometric view of the device shown in FIG. 4 having a mask upon the grafting parts and adjacent polymer material for forming a longitudinal core section.
Figure 6:
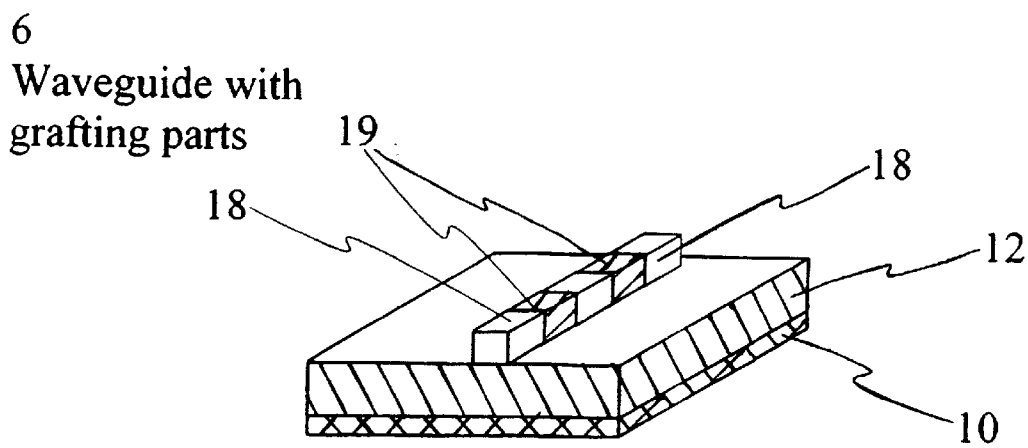
FIG. 6 is an isometric view of the device shown in FIG. 5, wherein the composite core with grafted sections are shown after removal of the unmasked surrounding material, awaiting a final upper cladding layer to be spin-coated thereon.
Figure 7:
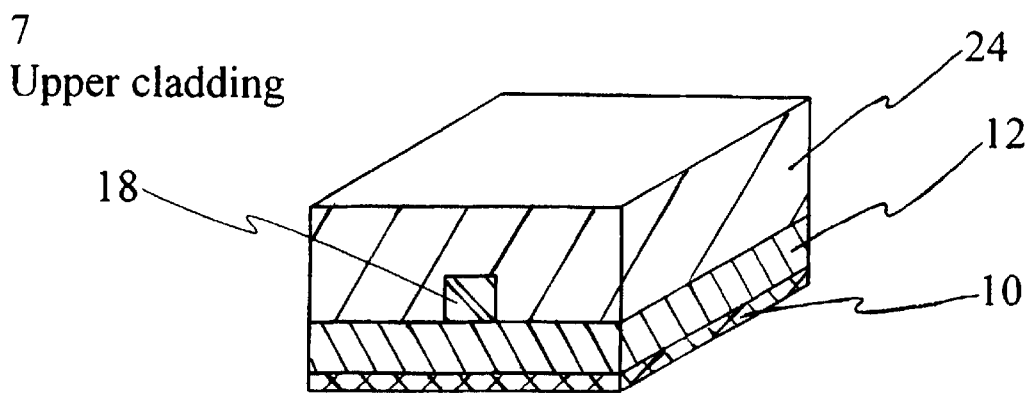
FIG. 7 is an isometric view of a waveguide device having a grafted core surrounded by a cladding.

The grafting of planar polymeric waveguides is known and is described in a publication entitled Novel "serially grafted" connection between functional and passive polymer waveguides, by Watanabe et al Appi. Phys. Lett. 65 (10), Sep. 5, 1994, pp. 1205–1207 The process steps required to create inlay-structures are shown in the figures and begin with spin-coating a lower cladding layer 12 onto a silicon substrate 10 followed by coating the core polymer 14 as is shown in FIG. 1. This core layer is used to create parts to be grafted. FIG. 2 illustrates the application metal structures 16 used as a mask for the grafting parts and realized onto lift off resist by evaporation of a metal layer, resist spinning and definition by photo-lithography. The grafting parts 18 are shown in FIG. 3 after reactive ion etching (RIE) to remove the unmasked core layer material. After a lift-off step to remove the metal mask, a second core layer 20 is spin coated. The remaining portion of the waveguide core is formed by this layer. Conventional etch-back planarization is performed to reach a flat surface. A planarization layer is spin-coated onto the second core layer 20 and then etched back until the preferred waveguide height is reached. The topography of the upper surface of the planarization layer is transferred to the underlying layer. In this manner a polymer stack with grafted parts and a flat surface is reached as shown in FIG. 4. After this, another metal structure 22 is defined onto lift-off resist, by evaporation of a metal layer, resist spinning and definition by photo-lithography with the final waveguide pattern as shown in FIG. 5. FIG. 6 illustrates the waveguide consisting of grafted parts 18, 19 after reactive ion etching. FIG. 7 illustrates the polymer stack after a final spin-coat 24 of upper cladding is applied.

Although optical devices made of two different polymer cores such as the grafted cores described heretofore are useful in certain optical applications, it is believed that this structure can greatly be improved upon.

This invention relates to the provision of an optical waveguide having a core wherein a region of the core is a polymer material and wherein an adjacent contiguous region of the core of the waveguide is inorganic glass preferably silica. Since silica is highly transparent, and less attenuating than polymer materials, it is preferable in most instances to manufacture devices wherein the core is substantially made of silica, and wherein a much smaller lesser portion is made of polymer. Furthermore, many of the benefits of polymer can be utilized by using only a small amount of polymer in these devices. For example in an active device such as an optical switch, the switching region itself can be realized with a small polymer grafted insert. In temperature stable devices, where the advantageous combination of combining a core of polymer with a core of silica is provided, the ratio of polymer to silica or glass is about 1:10, hence only a small amount of polymer is required in many instances in smaller devices. Polymer silica hybrid core waveguides as described hereafter are particularly suitable in optical switch or in-line Bragg grating applications for a plurality of reasons. Since a polymer silica core hybrid waveguide can be provided wherein the refractive index is the same at ambient temperature, or at a predetermined temperature, gratings can be manufactured which are substantially transmissive at a particular temperature and which are highly reflective at other higher temperatures for predetermined wavelengths of light. Hence such an optical waveguide would act as a reflective (or forward coupling) filter when heat is applied and would act as if the grating was absent when the heat was removed. Instead of the multiple polymer silica sections that are used in the gratings, a single polymer section would act as a wavelength insensitive reflector when heat is applied and would act as if the reflector was absent when the heat was removed.

Thus, practicable, useful active and passive optical devices can be made from the waveguides in accordance with this invention.

FIGS. 1 through 7 as shown relate to the formation of a hybrid grafted core section having two different polymer materials adjacent one another forming the core of the waveguide. This process can be extended to yield a hybrid silica/polymer core in accordance with this invention. Referring now to FIGS. 1 through 7 again, the initial base layers 12 and 14 are now made of silica; these layers can be created by flame hydrolysis deposition (FHD) process or a chemical vapour deposition (CVD) process; these layers precede polymer layers because they fabricated at temperatures well above the degradation temperature for polymers. Initially the lower silica cladding layer 12 is deposited onto the silicon substrate 10, followed by the silica core layer 14. This is illustrated in FIG. 1 Channel waveguide core sections will be etched out of the core layer by means of reactive ion etching (RIE) in CHF$_3$, Ar gas mixtures using a Cr mask. This mask 16 is created by Cr layer sputtering onto the core layer followed by standard photolithographic resist patterning and wet chemical etching. Hence openings for the polymer channels section to be disposed are provided as is illustrated in FIG. 2. After RIE, the mask is removed by a wet chemical etching process and the silica grafting parts 18 are ready for polymer overcoating as can be seen in FIG. 3.

This is illustrated in FIG. 4 where a solution of cross-linkable polymer for the core sections has been spin-coated onto the wafer to embed the remaining silica core sections 18 in the core polymer 20. Dependent on the polymer that is used, thermal or photocuring is used to make the polymer layer insoluble. Additional cured polymer layers can be deposited over this layer to further planarize the surface. The polymer surface is then etched down to the upper core surface using RIE with O$_2$. A continuous Ti mask pattern 22 for the hybrid channel waveguide is formed onto this surface by means of a standard photolithographic resist patterning followed by dry etching using RIE with SF$_6$. This is shown in FIG. 5 The Ti is evaporated onto a photoresist layer that is spincoated first onto the surface. FIG. 6 shows the continuous hybrid channel 18+19 that is created by polymer etching using O$_2$-RIE. The mask pattern is removed by a lift off procedure. Finally a polymer upper cladding layer 24 having a refractive index that is lower than the refractive index of the polymer core sections is spin-coated over the hybrid channel waveguide structure as illustrated in FIG. 7. After curing it forms an insoluble upper cladding layer. The final waveguide is formed of core sections of silica 18 and adjacent core sections 19 of polymer.

Figure 8:
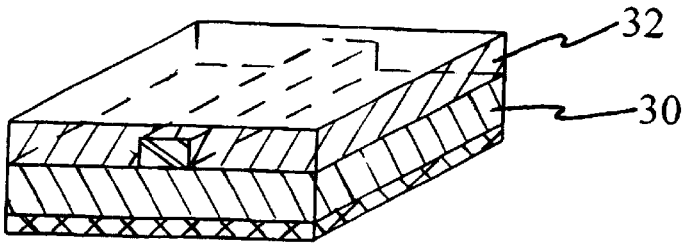
FIGS. 8 through 11 are isometric views of a grafting process for providing polymer core sections into a silica core waveguide.
Figure 9:
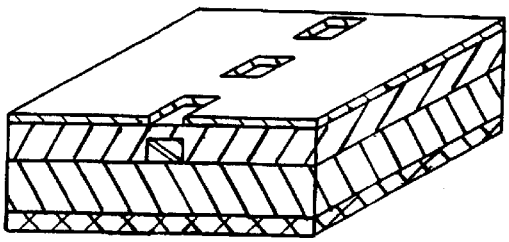
Figure 10:
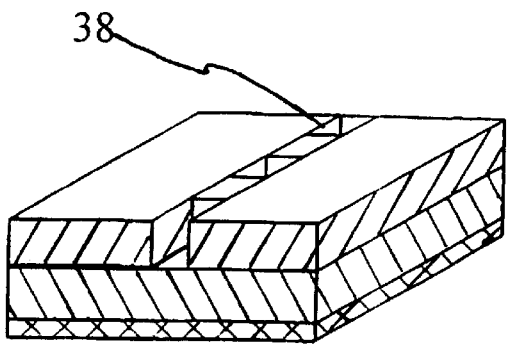
Figure 11:
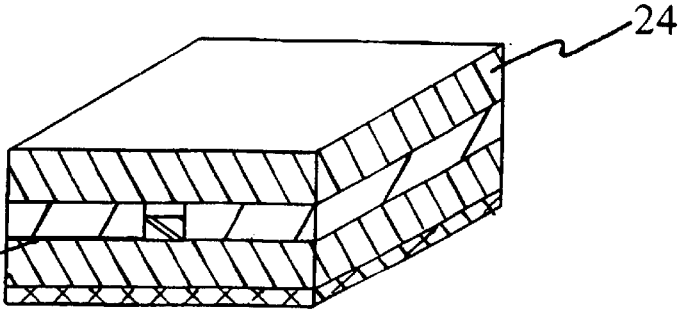

FIGS. 8 to 11 show an alternative process that begins from silica channel waveguides 34 including the upper silica cladding 32 (FIG. 8). Sections for the polymer core are provided by etching out the silica down to the lower silica cladding using a metal mask (FIG. 9) to make grafting gaps in the silica core by RIE (FIG. 10). The gaps are filled first with the core polymer by spincoating and curing. This polymer is then etched down by RIE with O$_2$ to the upper core interface. This process can be carried out without the use of a mask, because the silica is not etched in the RIE process for the polymer. A polymer cladding is applied thereafter (FIG. 11).

Figure 12A:
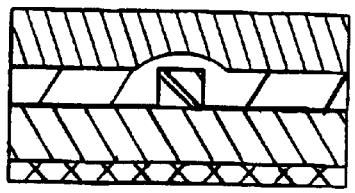
FIGS. 12a through 12d illustrate different etch back states.
Figure 12B:
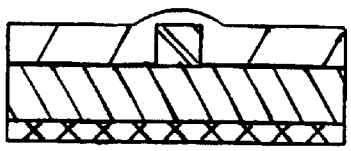
Figure 12C:
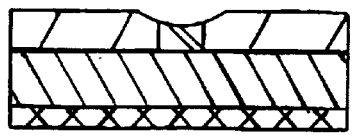
Figure 12D:

Referring now to FIGS. 12a through 12d the etch back principle is illustrated. To successfully etch back the planarization material has to have the same etch speed as the core or grafting material. The initial situation is a layer stack which is built up to the planarization layer as show in 12a. When the etch rate of the planarization material v$_p$ is larger than the etch rate of the core materials v$_c$ a bump will remain as illustrated in FIG. 12b. When the etch rate of the planarization material is smaller than the etch rate of the core material a dent can arise as shown in FIG. 12c. Preferably as shown in FIG. 12d, v$_p$=v$_c$.

Figure 13:
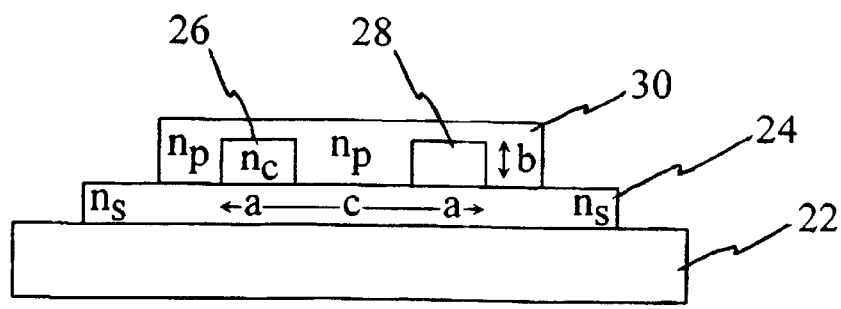
FIG. 13 is a cross sectional view from a prior art patent EP 0707113A1 in the name of Bosc et al assigned to France Telecom wherein a planar waveguide is disclosed having silica core and a polymer cladding region.

FIG. 13 shows in a prior art European patent application EP 0797113A1 in the name of Bosc et al. a planar waveguide having silica core and a polymer cladding region. Although there are advantages to such a structure, in contrast the instant invention provides a planar optical waveguide that provides an entirely new class of optical devices.

This invention provides control of and within the core of a waveguide itself.

Hence by using these two very compatible materials having significantly different properties within a core of an optical waveguide, a host of new devices are practicable; devices which can route, switch, multiplex and modify channels or wavelengths of light; devices essential for optical communications. The core of the waveguide need not be confined to small dimension typically associated with single mode propagation of light; core dimensions may in fact be considerably larger, for example for use in applications such as multimode interference devices.

Figure 14:
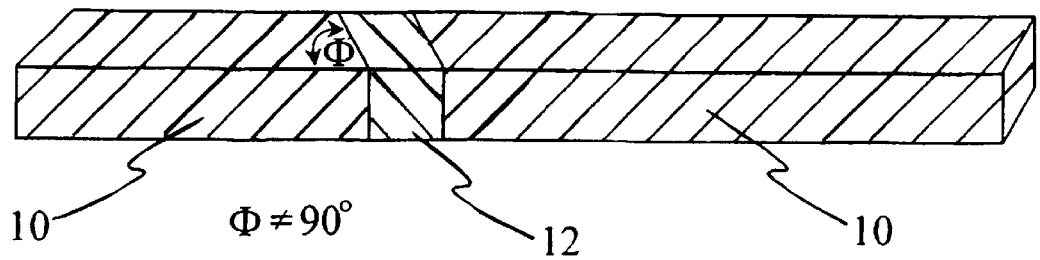
FIG. 14 is an isometric view of a hybrid core of an optical waveguide in accordance with an embodiment of the invention.
Figure 15:
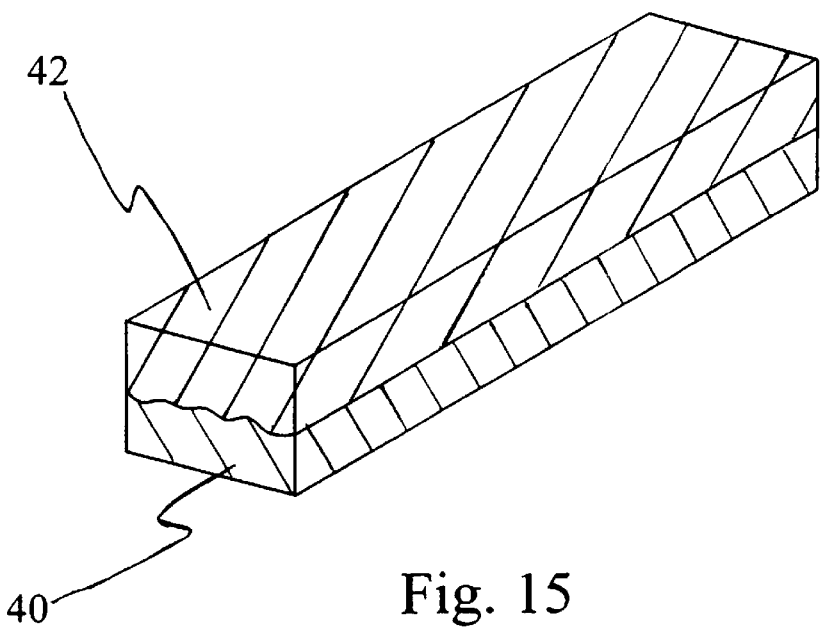
FIG. 15 is an isometric view of an alternative hybrid core of an optical waveguide.

Referring now to FIG. 14, a core of an optical waveguide is shown, in accordance with this invention, having a polymer portion 12, grafted between two silica sections 10. Of course a suitable cladding is required (not shown) around the waveguide core in FIG. 14 to ensure that light is confined within the core. Although the polymer portion 12 and silica sections 10 are adjacent and contiguous to one another in a longitudinal sense, serially one portion after the other, this invention is not confined to longitudinal contiguous sections or portions of silica and polymer within a core of a waveguide. For instance, in FIG. 15 a core is shown having two contiguous portions of silica 40 and polymer 42, wherein there are no longitudinal abutting portions. Alternatively, hybrid cores shown in FIG. 14 and FIG. 15 can be provided where a portion of a silica core is grafted with polymer as shown in FIG. 16. Here, polymer sections 52 are grafted into voids created within the silica core 50 to achieve a grating. Of course these grafted sections can have polymers of different refractive indices to provide a chirped grating, or alternatively, the width of the sections 52 can be varied linearly or non-linearly to achieve a desired chirped effect. It should be noted that a cladding layer of polymer or glass is not shown. Gratings can be realized by creating comb like structure within a silica waveguide and spin coating polymer to fill in the voids, or alternatively, by grafting in polymer sections.

Multi-mode interference couplers are well known and are described in the following text:L. B. Soldano and E. C. M. Pennings, Optical multi-mode interference devices based on self-imaging: principles and applications, J. Lightwave Technolgy. 13 (4), 615–627 (1995).

Figure 17:
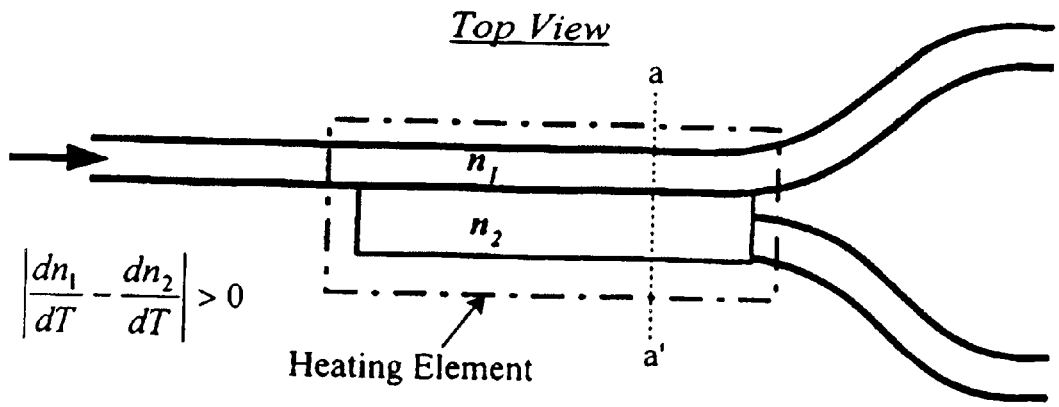
FIG. 17 is a top view of an optical coupler in accordance with a preferred embodiment of the invention.
Figure 18:
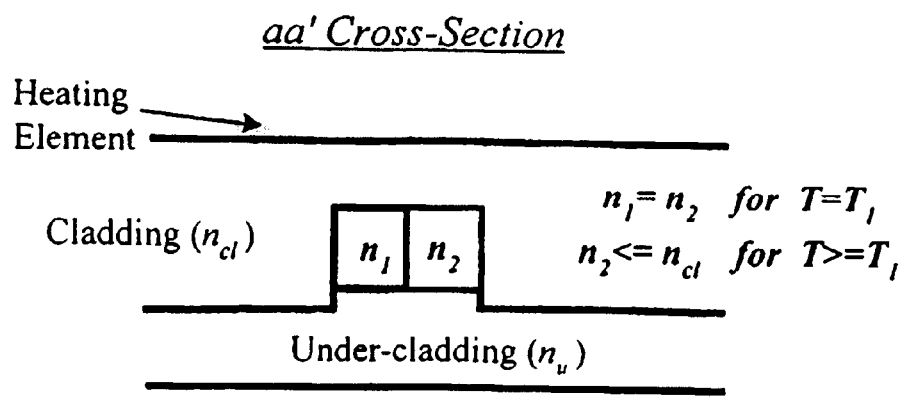
FIG. 18 is a side view of the optical coupler shown in FIG. 17 in accordance with a preferred embodiment of the invention.

Turning now to FIGS. 17 and 18, the figures show an MMI optical switch/attenuator based on hybrid materials is shown in accordance with an embodiment of the invention having a first glass waveguide 170 preferably having a glass core and having a second hybrid waveguide 172 having a section of polymer 174 shown as a dotted region and a contiguous section of glass 176. Preferably, the polymer waveguide section 174 is wider than the waveguide 170, which allows for better operation and ease of design of the MMI coupler formed by the two regions covered by the heating element. Furthermore, this allows for a greater physical separation of the output ports, for example glass cores 170 and 176. The cores 172, 174, and 176 are clad in a cladding 178 shown in FIG. 18 having a lower refractive index than the glass core. The device consists of one input port and two output ports. A heating element 175 is provided on top of the device, and in operation, the switching operation in this device is digital. When the device is heated, the value of the refractive index of the polymer is equal or less than that of the cladding. Then the incoming light is simply directed to the top output port. On the other hand, when the temperature of the device is lowered, the value of the refractive index of the polymer 174 is equal to that of the glass 170 and an MMI coupler is formed at the central portion of the device covered by the heating element 175. By properly selecting suitable dimensions for the MMI coupler, light is switched to the lower output port. The operation of this switch is based on suppressed multimode interference in the MMI coupler formed at the center of the device. Although the device described in accordance with this invention has a polymer region, it is preferable for as much of the waveguides as possible to be made of silica which is more transparent and has less unwanted loss. The high thermo-optic coefficient and low thermal conductivity of polymers provide a simple and effective switching medium when coupled with silica in this manner. Furthermore, the high transmissivity of silica provides a switch that is relatively efficient with little loss. Only the active region that is a small portion of the switch shown need be made of polymer.

In operation, $n_1=n_2$ for $T=T_1$ and, $n_2 \leq n_{c1}$ for $T \geq T_1$. and when n1=n2 the device functions as an MMI coupler and when $n_1 \neq n_2$ the device functions as a suppressed MMI. When $n_2=n_{c1}$, light simply propagates along the input waveguide having a refractive index $n_1$.

Several prior art patents describe the function and operation of the MMI couplers which is well known, MMI couplers are described in U.S. Pat. No. 5,698,597 in the name of Besse, issued Nov. 18, 1997, and U.S. Pat. No. 5,953,467 in the name of Madsen issued Sep. 14, 1999, both incorporated herein by reference. An MMI coupler is also described in co-pending U.S. patent application Ser. No. 09/556,188 in the name of the applicant Paiam.

Figure 19:
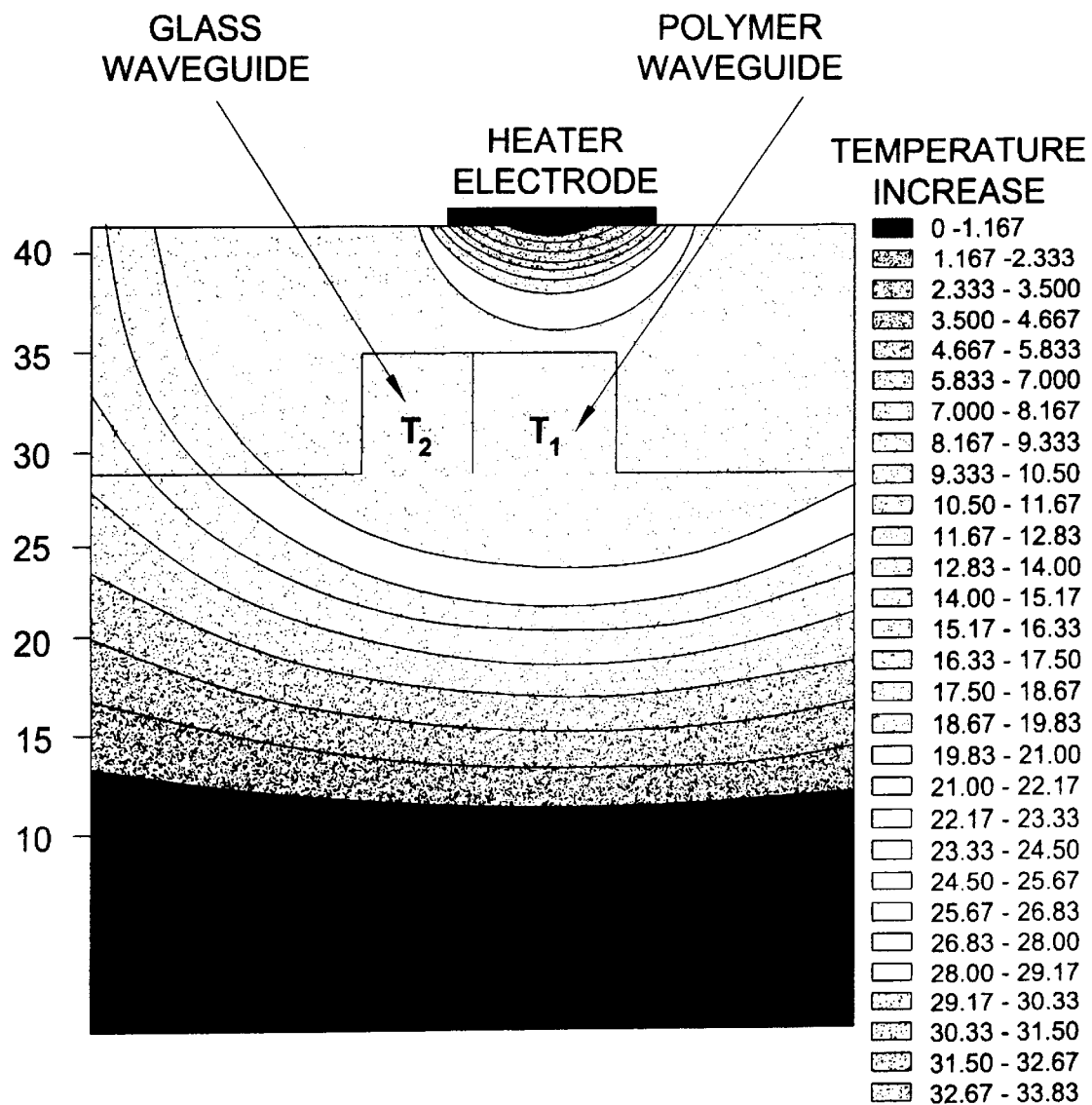
FIG. 19 is an illustration indicating thermally induced effective refractive index difference in a hybrid digital optical switch having a glass waveguide adjacent and parallel to a polymer waveguide.

The required local temperature change in thermo-optic devices is generated by electrodes that are deposited onto the waveguide cladding layer in order to avoid the interaction of light in the waveguide core with these electrodes that would lead to optical loss. The operation of various devices in accordance with this invention is based on inducing a difference in the core refractive indices of two or more close-by channel waveguides. Referring now to FIG. 19, the separation of the heater electrode from the channel core by the cladding layer and the fanning of the thermal field from the electrode would typically make it difficult to heat only one core and not the other; however by using different core materials in the coupler, for example, polymer and glass, the refractive index difference between the two cores is now largely determined by the refractive index change of the polymer core alone, because the refractive index change of the silica core is negligible compared to that of the polymer core. By powering the heater electrode, the refractive index of the polymer core can be brought below the value of the refractive index of the silica core and even equal to that of the cladding.

Of course, numerous other active devices can be envisaged that utilize the basic principles of this invention. For example, instead of using a polymer having a large negative thermo-optic coefficient, an electro-optic (EO) polymer having a change in refractive index with applied voltage can be used, to provide a device that functions in a same manner as a MMI or suppressed MMI coupler. U.S. Pat. No. 5,016,959 incorporated herein by reference, entitled Electro-optical component and method for making the same, in the name of M. Diemeer, describes a light conducting layer is formed from a poleable or poled glassy polymer material, which has an e/o activity which is definitively destructible under ionizing radiation. A selective irradiation under a parallel beam will give sharp transitions from and e/o active area (or an area which can still be electro-optically activated) to an e/o inactive area. The buffer layers can also consist of such irradiated material. A suitable positioning of the electrodes between which, by means of a difference in voltage applied across the electrode connections, an electric field with a sufficient intensity and/or uniformity can be induced extending into the border area, on both sides of the transition boundaries, will make it possible to induce sharp refractive-index transitions.

Alternatively, a polymer can be used wherein the refractive index of the polymer is varied by compressing the polymer, for example by use of piezoelectric transducers, or alternatively by electro-static plates.

What is claimed is:

1. A multi-mode interference optical device comprising:
   a first waveguide having an input end and an output end and having a glass core;
   a second waveguide having a hybrid core including a first core section of a first thermo-optically active material and a second contiguous core section of glass, the first material and the glass having substantially different thermo-optic coefficients, the second waveguide having a section juxtaposed to and abutting sidewise the glass core of the first waveguide, the juxtaposed section shaped and dimensioned to enable multi-mode interference between beams propagating in the first and the second waveguide when refractive indices of the first and the second waveguide are equal;
   a cladding covering at least some of the hybrid core and some of the first waveguide glass core; and a heater coupled to the cladding in thermal contact with at least the first core section for relatively varying the refractive index difference between the first section of the hybrid core and the glass core in the first waveguide in a controlled manner, so that the refractive index difference between the glass and the first material is variable between substantially about zero, whereby MMI coupling can take place in the optical device, and some number different than zero in the presence or absence of applied heat.

2. A multi-mode interference optical device as defined in claim 1 wherein the first thermo-optically active material is a polymer.

3. A multi-mode interference optical device as defined in claim 2 wherein the device is operable in a first mode as a suppressed MMI coupler when the refractive index difference between the polymer and the glass cores is greater than zero and wherein the device operates in a second mode as an MMI coupler when the refractive index difference between the polymer and the glass cores is substantially about zero.

4. A multi-mode interference optical device as defined in claim 2, wherein the device is one of a switch, an attenuator and a coupler.

5. A multi-mode interference optical device as defined in claim 3, wherein the device is one of a switch, an attenuator and a coupler.

6. A multi-mode interference optical device comprising:

a first waveguide having an input end and an output end and having a glass core;

a second waveguide having a first core section of a first thermo-optically active material, the first material and the glass having substantially different thermo-optic coefficients, the second waveguide having a section juxtaposed to and abutting sidewise the glass core of the first waveguide, the juxtaposed section shaped and dimensioned to enable multi-mode interference between beams propagating in the first and the second waveguide when refractive indices of the first and the second waveguide are equal;

a cladding covering at least some of the hybrid core and some of the first waveguide glass core; and a heater coupled to the cladding in thermal contact with at least the first core section for relatively varying the refractive index difference between the first core section and the glass core in the first waveguide in a controlled manner, so that the refractive index difference between the glass and the first material is variable between substantially about zero, whereby MMI coupling can take place in the optical device, and some number different than zero in the presence or absence of applied heat.

7. An MMI coupler comprising:

a first waveguide core of silica;

a second waveguide core of polymer, the second waveguide having a section juxtaposed to and abutting sidewise the first waveguide core of silica, the juxtaposed section shaped and dimensioned to enable multimode interference between beams propagating in the first and the second waveguide when refractive indices of the first and the second waveguide are equal;

a cladding covering the first and second waveguide core, having a lower refractive index than the silica core; and, a controllable heater for heating at least a region of the second waveguide core, at least the contacting regions of the first and second waveguide cores defining the length of the MMI coupler.

8. An MMI coupler as defined in claim 7, wherein the first and second waveguides are parallel to one another.

9. An MMI coupler as defined in claim 8 wherein the coupler is operable as an MMI coupler in a first mode of operation and is operable as a single mode waveguide in a second mode of operation.

10. An MMI coupler as defined in claim 8 wherein the coupler is operable as an MMI coupler in a first mode of operation and is operable as a suppressed MMI coupler in a second mode of operation.

11. An MMI coupler as defined in claim 7, wherein the length of the second waveguide core is the length of the MMI coupler.

12. An MMI coupler as defined in claim 11, wherein the second waveguide core has a third waveguide core of silica at one end thereof, serving as a port and a means of guiding light from the MMI coupler.

13. An MMI coupler as defined in claim 12, wherein the coupler has three ports.

14. An MMI coupler as defined in claim 13, wherein the device is operable in a first mode of operation as an MMI coupler having three ports and wherein in a second mode of operation when a refractive index of the second waveguide core is equal to the refractive index of the cladding the device operates as a two port single mode waveguide.

15. A tunable optical MMI coupler comprising:

a first single mode glass waveguide core with a first refractive index $n_1$ and a second polymer waveguide core having at least a portion juxtaposed to and abutting sidewise the first glass waveguide, the juxtaposed section shaped and dimensioned to enable multi-mode interference between beams propagating in the first and the second waveguide when refractive indices of the first and the second waveguide are equal;

a cladding having a second refractive index $n_2$ covering at least some of the first single mode waveguide and the second polymer waveguide; and heating means for varying the refractive index of the second waveguide core to values between $n_1$ and $n_2$, whereby when the refractive index of the second waveguide is $n_1$, MMI coupling can take place in the optical device.

16. A tunable MMI coupler as defined in claim 15, wherein the length of the portion contacting and in parallel, defines the length of the MMI coupler.

17. A tunable optical device as defined in claim 16 wherein the means for varying the refractive index of the second waveguide is a voltage source.

18. A tunable optical device as defined in claim 15 wherein the polymer waveguide is an electro-optic waveguide having a property wherein the refractive index is variable in the presence of an applied voltage.

* * * * *